United States Patent [19]

Chen

[11] Patent Number: 5,080,788
[45] Date of Patent: Jan. 14, 1992

[54] WATER FILTER WITH FLUID ACTUATED CLEANER

[76] Inventor: T. H. Chen, 3F, No. 73, Chien Kwo Road, Hsinten, Taipei Hsien, Taiwan

[21] Appl. No.: 573,464

[22] Filed: Aug. 27, 1990

[51] Int. Cl.$^5$ .............................................. B01D 29/64
[52] U.S. Cl. .................................... 210/355; 210/415; 210/441; 15/246
[58] Field of Search ............... 210/408, 353, 354, 106, 210/107, 413, 415, 355, 407, 414, 441; 15/246

[56] References Cited

U.S. PATENT DOCUMENTS

| | | | |
|---|---|---|---|
| 337,423 | 3/1886 | Moore | 210/408 |
| 4,320,002 | 3/1982 | Ihara | 210/213 |

FOREIGN PATENT DOCUMENTS 747495  7/1980  U.S.S.R. ............................. 210/355

*Primary Examiner*—W. Gary Jones
*Assistant Examiner*—Matthew O. Savage
*Attorney, Agent, or Firm*—Dvorak and Traub

[57] ABSTRACT

An apparatus for cleansing water including a fluid driven cleaner is disclosed herein. The apparatus includes a hollow casing having an upper open end and a central axis, a perforated tube disposed along said central axis inside the casing, the tube being in flow communication with a drinking water control valve, a porous ceramic core filter element disposed around the tube, a cover for covering said upper open end, the cover including an axle, an upper float disposed above the filter element, the upper float including a hole, the axle being rotatably disposed in the hole in the upper float, a lower float disposed below the filter element, the upper and lower floats including fastening means for maintaining a fixed distance between said floats, and a plurality of roller brushes rotatably fasted between the upper and lower floats for cleaning dirt from the outer surface of the filter element, blade means for rotatably driving the floats disposed in the upper and said lower floats, and inlet means for directing a pressurized flow of water to rotatably drive the blade means, whereby pressurized water impinging the blade means causes rotation of the floats such that the roller brushes scrape filtered dirt from the outside surface of the filter element, resulting in automatic cleansing of the filter element.

3 Claims, 3 Drawing Sheets

WATER FILTER WITH FLUID ACTUATED CLEANER

BACKGROUND OF THE INVENTION

This invention relates to a "FILTER AUTOMATIC CLEANSING WATER CLEANER", comprised, in part, of a casing, washer, filter element, rotater, roller brush, packing and upper cover. Flowing water generates a force which causes rotation of the rotater. Dirt adhered to the outside of the filter element is scraped off by the roller brushes of the rotater, thereby automatically cleaning the filter element. As a result, the filter is better able to perform its function of cleansing water. The filter element is fitted with a bolt assembly, upper and lower floats, and a bladed rotater. Rotating roller brushes are disposed on the periphery of the upper and lower floats, and between the blades. On the inside of the casing, adjacent the upper and lower blades of the rotater, water inlets having a particular water spray angle are fitted.

When water flows through the apparatus, the force generated by the water pressure drives the blades of the rotater. The rotater rotates, thereby scraping off dirt adhered to the outside of the multi-hole ceramic element. The objective of automatically cleaning the filter element, to maintain clean water quality, is thereby realized.

General industrial development has resulted in certain conveniences, but has also brought with it the problem of environmental pollution. The pollution of water sources has become an important issue.

Although drinking-quality (tap) water is subjected to special treatment, water source pollution has exacerbated the occurrence of micro-organisms, sand, and dirt, in the final treated water. In the interest of improving people's health, a variety of water filters have been proposed, and have appeared on the market. The ordinary filter of this type requires regular cleaning or replacement. However, due to the fact that the average individual lacks either the time or the knowledge necessary to carry out the task of cleaning the filter element, often the filter element is left uncleaned.

The dirt adhered to an unclean filter element provides a region which may harbor bacteria, and creates a restriction to the water flow volume and pressure. Also, if the individual damages the filter element during the manual cleaning operation, an expense for replacing the element may result.

In view of the aforementioned defects, the inventor has addressed the objective of obtaining clean water by filtering, without the necessity of manually cleaning the filter. As a result of intensive study and design work, based on many years of professional experience, the inventor has created the subject invention.

SUMMARY OF THE INVENTION

This invention relates to a "FILTER AUTOMATIC CLEANSING WATER CLEANER", particularly one featuring a thrust of water which rotates the rotater.

Roller brushes disposed on said rotater brush off dirt adhered to the surface of the filter element. The disloged dirt flows away from the filter element, and then away from the apparatus, without passing through the filter.

The results of the invention are automatic filter element cleaning, and clean water quality.

The invention comprises, in part, a casing, pad, multihole ceramic core, rotater, roller brushes, washer, and upper cover. The multi-hole ceramic core includes an upper and lower float, and blades. The rotater is assembled with screw type bolts. Roller brushes are fitted along the central edge of the rotater.

Water entering the filter device impinges the blades of the rotater, causing rotation of the rotater and roller brushes. Dirt adhered to the surface of the multi-hole ceramic core is removed by the action of the brushes.

The automatic cleaning features of the invention facilitate improved water cleansing capabilities, which is of considerable practical value.

DETAILED DESCRIPTION OF THE PREFERRED EMBODIMENTS

Figure 1:
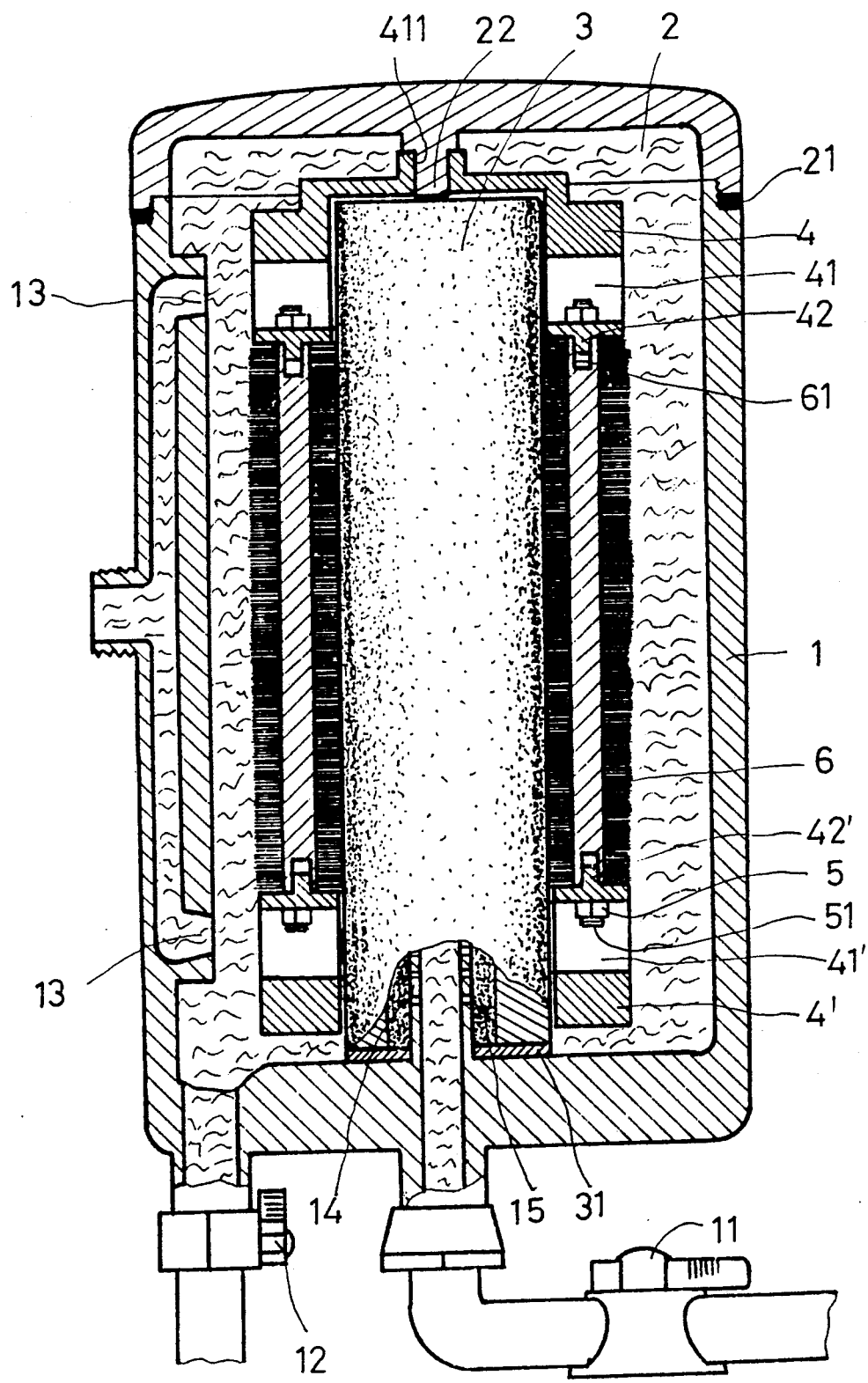
FIG. 1 is a section view of the invention.
Figure 2:
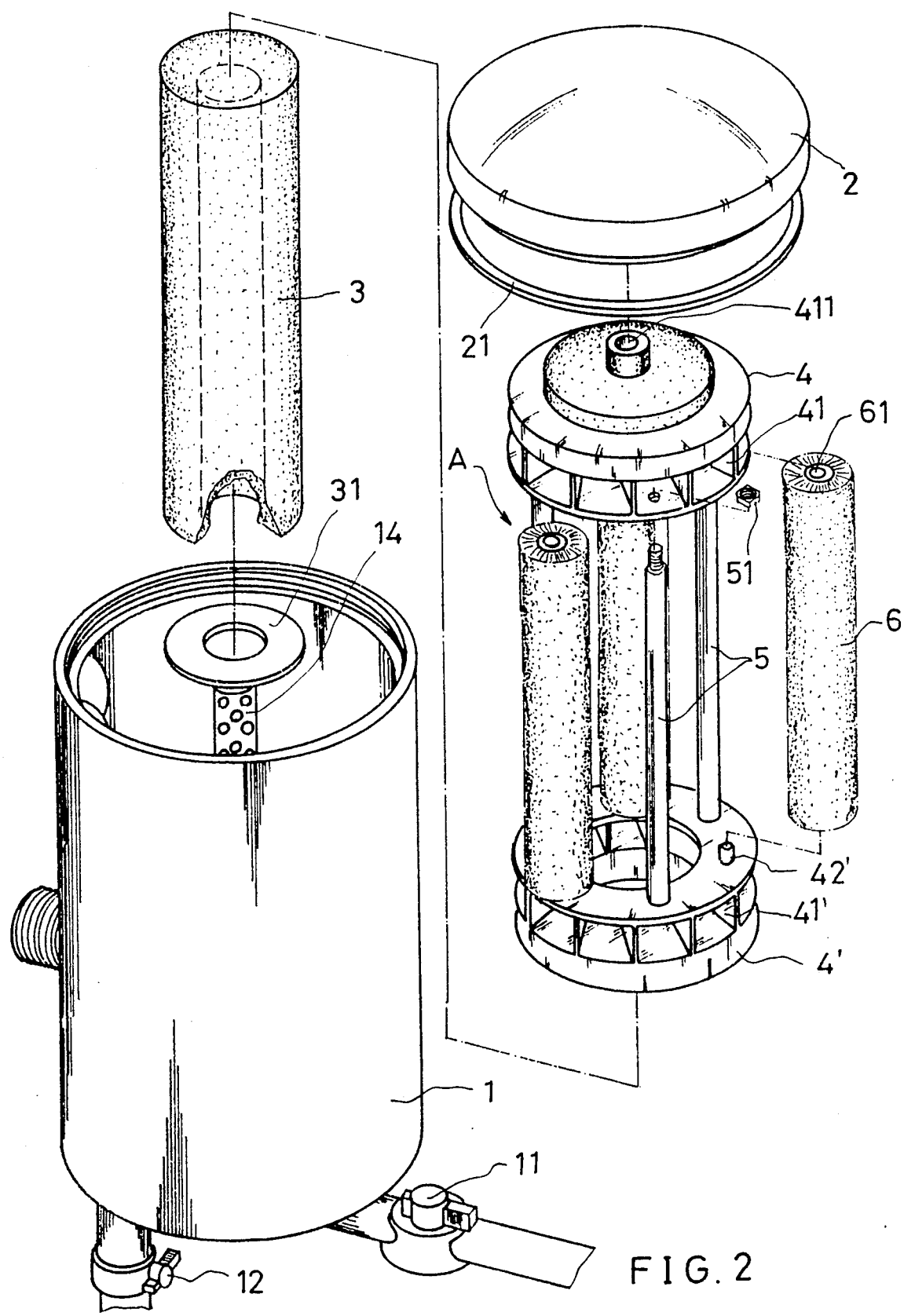
FIG. 2 is an exploded view of the invention.
Figure 3:
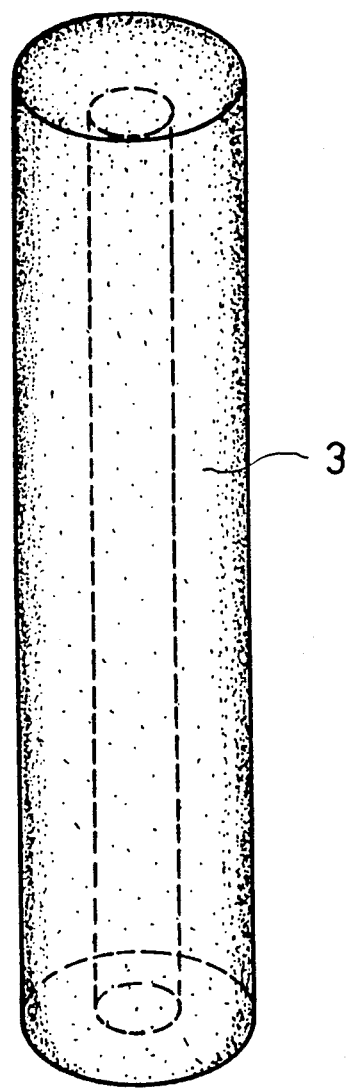
FIG. 3 is a perspective view of the whetstone pillar.

Referring to FIG. 1 and FIG. 2, the invention comprises a washer (31) and a porous ceramic core (3) with active carbon (15) at the communicating perforated tube (14) between the interior center and drinking water control valve (11). The upper cover (2) and washer (21) are twist-locked at the top of casing (1), so that the multi-hole ceramic core (3) is fixed at a central position.

Rotater (A) has upper and lower floats (4) (4') and blades (41) (41'), and a porous ceramic core (3), assembled together with a screw (51) and bolt (5). Projecting posts (42) (42') are disposed on a side of each of the upper and lower blades (41) (41'). Access holes (61) on each end of the roller brushes accommodate the projecting posts, for mounting the roller brushes thereon. An access hole (411), aligned with the central axle (22), is disposed at the upper end of the rotater (A).

An angled water spray inlet (13) is positioned adjacent the upper and the lower blades (41) (41'), such that flowing water drives the blades (41) (41'), causing rotater (A) to rotate. In this manner, the roller brushes (6) scrape off dirt adhered to the surface of the porous ceramic core (3).

Upon opening the washing water control valve (12), the water containing the dislodged dirt will drain from the washing water control valve, without passing through the multi-hole ceramic core (3). Clean water quality is thereby maintained.

I claim:

1. An apparatus for cleansing water, comprising:
   a hollow casing having an upper open end and an central axis;
   a perforated tube disposed along said central axis inside said casing, said tube being in flow communication with a drinking water control valve;
   a porous ceramic core filter element disposed around said tube;
   cover means for covering said upper open end;
   said cover means including an axle extending inside said casing along said central axis;
   an upper float disposed above said filter element, said upper float including a hole aligned along said central axis, said axle being rotatably disposed in the hole in said upper float;
   a lower float disposed below said filter element;

said upper and lower floats including fastening means for maintaining a fixed distance between said floats;

roller brush means for scraping dirt from an outer surface of said filter element disposed between said upper and said lower float, said roller brush means comprising a plurality of roller brushes having longitudinal axes parallel to said central axis of said casing, and having axis holes at each end;

projecting post means disposed on said upper float and said lower float and extending into said access holes for rotatably supporting said roller brush means;

said roller brush means and said upper and lower floats being fastened together by said fastening means to form a unit;

blade means for rotatably driving said unit disposed in said upper and said lower floats;

an inlet means for directing a pressurized flow of water to rotatably drive said blade means;

whereby pressurized water impinging said blade means causes rotation of said unit such that said roller brush means scrape filtered dirt from the outside surface of said filter element, resulting in automatic cleansing of the filter element.

2. An apparatus for cleansing water according to claim 1, wherein said inlet means comprises upper and lower water supply inlets disposed in said casing adjacent respective said blade means, said upper and lower water inlets being disposed at an angle relative to said blade means such that water flowing from said upper and lower supply inlet rotatably drives said blade means.

3. An apparatus for cleansing water according to claim 2, wherein said roller brush means comprise a plurality of roller pillars made of whetstone.

* * * * *